United States Patent

Stagnitto et al.

[11] Patent Number: 5,993,365
[45] Date of Patent: Nov. 30, 1999

[54] TOOL ATTACHMENT AND RELEASE DEVICE FOR ROBOTIC ARMS

[75] Inventors: Joseph E. Stagnitto, Rochester; Camiel J. Raes, Phelps; James A. White, Conesus, all of N.Y.

[73] Assignee: Eastman Kodak Company, Rochester, N.Y.

[21] Appl. No.: 09/048,441

[22] Filed: Mar. 26, 1998

[51] Int. Cl.$^6$ .................................................. B23Q 3/155
[52] U.S. Cl. .............................. 483/59; 414/736; 901/41; 483/58; 483/901
[58] Field of Search .................................... 483/901, 902, 483/13, 31, 19, 54, 55, 58, 59; 414/736; 901/41, 42, 50, 49; 24/70.6

[56] References Cited

U.S. PATENT DOCUMENTS

| | | | |
|---|---|---|---|
| 2,346,193 | 4/1944 | Simmons | 175/367 |
| 3,079,191 | 2/1963 | Engelsted et al. | 294/65.5 |
| 3,503,024 | 3/1970 | Iwaski | 335/285 |
| 3,568,849 | 3/1971 | Hutchison | 211/60 |
| 3,775,717 | 11/1973 | Braillon | 335/295 |
| 4,310,958 | 1/1982 | Balaud et al. | 29/26 A |
| 4,408,752 | 10/1983 | Uchikune et al. | 269/8 |
| 4,486,928 | 12/1984 | Tucker et al. | 29/26 A |
| 4,542,890 | 9/1985 | Braillon | 269/8 |
| 4,635,985 | 1/1987 | Rooke | 414/736 X |
| 4,767,910 | 8/1988 | Stevens, Jr. et al. | 901/42 X |
| 4,995,493 | 2/1991 | Cotsman et al. | 901/49 X |
| 5,028,901 | 7/1991 | Enderle et al. | 483/31 X |
| 5,243,314 | 9/1993 | Maruyama | 335/285 |
| 5,376,062 | 12/1994 | Zeichner | 483/55 |
| 5,575,597 | 11/1996 | Bailey et al. | 901/50 X |

*Primary Examiner*—William Briggs
*Attorney, Agent, or Firm*—Mark G. Bocchetti

[57] ABSTRACT

A tool attachment and release system for robotic arms which using a magnet for supplying the attractive force to hold the tool to the robotic arm while allowing separation of tools from the robotic arm without manual intervention. A series of tools are held at predetermined locations in a tool rack allowing the robot to automatically deposit therein or acquire therefrom a particular tool. Permanent magnets are mounted between steel inserts in the tool attachment block. The steel insert are used to direct and concentrate magnetic flux to the tool attachment surface and also to each of two shunt bar contact surfaces. During the attach and disconnect operations, magnetic flux shunt bars are placed in close proximity to the two shunt bar contact surfaces to thereby provide an alternative path for the magnetic flux. This greatly reduces but does not eliminate the attractive force between the tool adapter plate and the attachment block. This results in a relatively easy disconnect of a particular tool with its associated adapter plate thus allowing a simple, inexpensive, low force capability device to be used for controlling the disconnect process. However, there will remain enough residual attractive force to keep the adapter plate from falling off of the attachment block in an uncontrolled manner.

8 Claims, 11 Drawing Sheets

TOOL ATTACHMENT AND RELEASE DEVICE FOR ROBOTIC ARMS

FIELD OF THE INVENTION

The present invention relates generally to the attachment of tools to robotic arms and, more particularly, to a tool changing device for use with robotic arms which uses permanent magnetics.

BACKGROUND OF THE INVENTION

Current technology for changing tools on robotic arms typically involves the use of tool racks with actuators enabled by air cylinders or magnetic coils to capture tools which the robotic arm moves in for attachment or away for detachment. For example, U.S. Pat. No. 5,376,062 to Zeichner teaches a robotic manufacturing unit which utilizes a pneumatic actuator for tool acquisition. Individual tools are apparently mounted on a flange which has a shank of non-circular cross section extending therefrom. There is at least a partially circumferential groove in the shank. The shank is insertable into the tool holding unit and through operation of a pneumatic actuator, the conical tip of the piston rod is driven to engage the groove in the shank to thereby retain the tool on the arm.

U.S. Pat. No. 4,486,928 to Tucker et al. teaches a tool attachment arrangement wherein doweling pins extending from the jaw mechanism of an arm insert into vertical holes in the tooling. The vertical holes are each provided with a spring loaded ball. There is an annular groove in each doweling pin which registers with the ball when the doweling pin is fully inserted. The pin is retained in the hole until a predetermined removal force is exerted, causing the balls to ride out the annular grooves in the doweling pins against the force of the springs.

U.S. Pat. No. 4,995,493 to Cotsman et al. teaches a robot tool changer which has first and second separable plates adapted to be respectively connected to a robot arm and to an end of arm tooling device. A magnet is connected to one of the plates and a steel insert is connected to the other of the plates for providing magnetic attraction therebetween for holding the first and second plates together. In order to separate the plates a pneumatic release force is applied between the plates.

The prior art fails to teach a tool rack which allows for the use of magnetic shunts allowing for the quick connection and disconnection of various tools held in the rack to the robotic arm without any manual intervention.

SUMMARY OF THE INVENTION

It is therefore an object of the present invention to provide a permanent magnet interface for holding tools by a robotic arm.

It is a further object of the present invention to provide a tool rack for holding multiple tools therein for engagement by a robotic arm with a magnetic interface which provides automatic engagement of magnetic shunts to enable removal of tools from the robotic arm without manual intervention.

Still another object of the present invention is to provide a tool rack wherein a robotic arm can acquire a new tool from the rack with automatic disengagement of magnetic shunts such that the tool is magnetically held to the robotic arm with sufficient force for operation of the tool.

Briefly stated, the foregoing and numerous other features, objects and advantages of the present invention will become readily apparent upon the reading of the detailed description, claims and drawings set forth herein. These features, objects and advantages are accomplished by using permanent magnets in the tooling attachment block of a robotic arm to provide the attractive forces necessary for holding ferrous metal adapter plates on which tools are mounted. A series of tools are held at predetermined locations in a tool rack allowing the robot to automatically deposit therein or acquire therefrom a particular tool. The permanent magnets are mounted between steel inserts in the tool attachment block located on the end of the robotic arm. These steel inserts are used to direct and concentrate magnetic flux to the tool attachment surface of a tool and also to each of two shunt bar contact surfaces. During the attach and disconnect operations, magnetic flux shunt bars are placed in close proximity to the two shunt bar contact surfaces to thereby provide an alternative path for the magnetic flux. This greatly reduces but does not eliminate the attractive force between the tool adapter plate and the attachment block. This results in a relatively easy disconnect of a particular tool with its associated adapter plate thus allowing a simple, inexpensive, low force capability device to be used for controlling the disconnect process. In other words, the tools can be changed without having to overcome the normal attachment force. However, there will remain enough residual attractive force to keep the adapter plate from failing off of the attachment block in an uncontrolled manner. This residual attachment force aids in maintaining alignment control of any tool being deposited in or acquired from the tool rack. Each tool location in the tool rack includes shunt bar slots on each side thereof to provide residence for the shunt bars when a tool is either being deposited in or acquired from that particular location.

DETAILED DESCRIPTION OF THE PREFERRED EMBODIMENT

Figure 1:
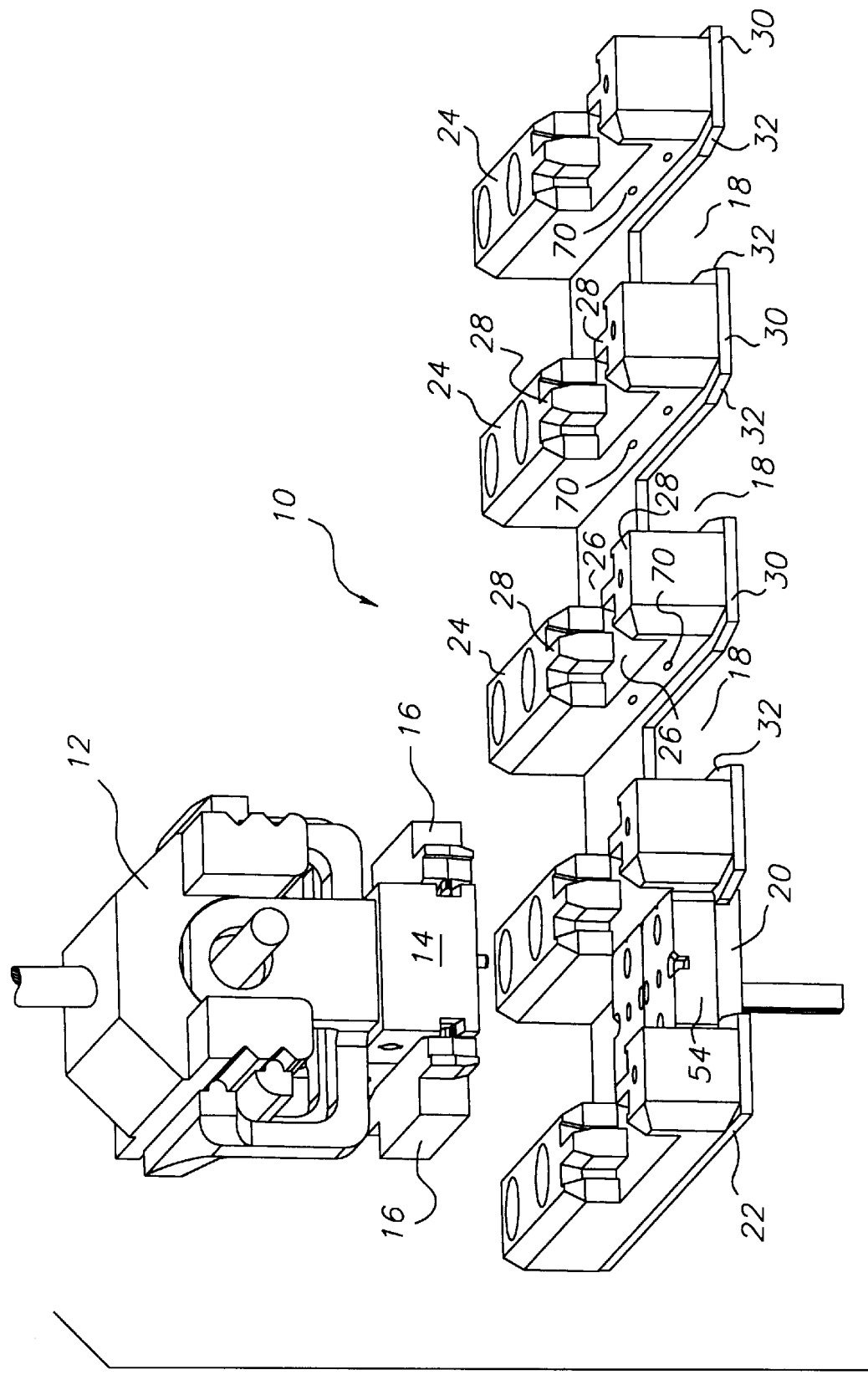
FIG. 1 is a perspective view of the tool rack and tool attachment block of the present invention with the tool attachment block affixed to the tool interface portion of the robotic arm.
Figure 2:
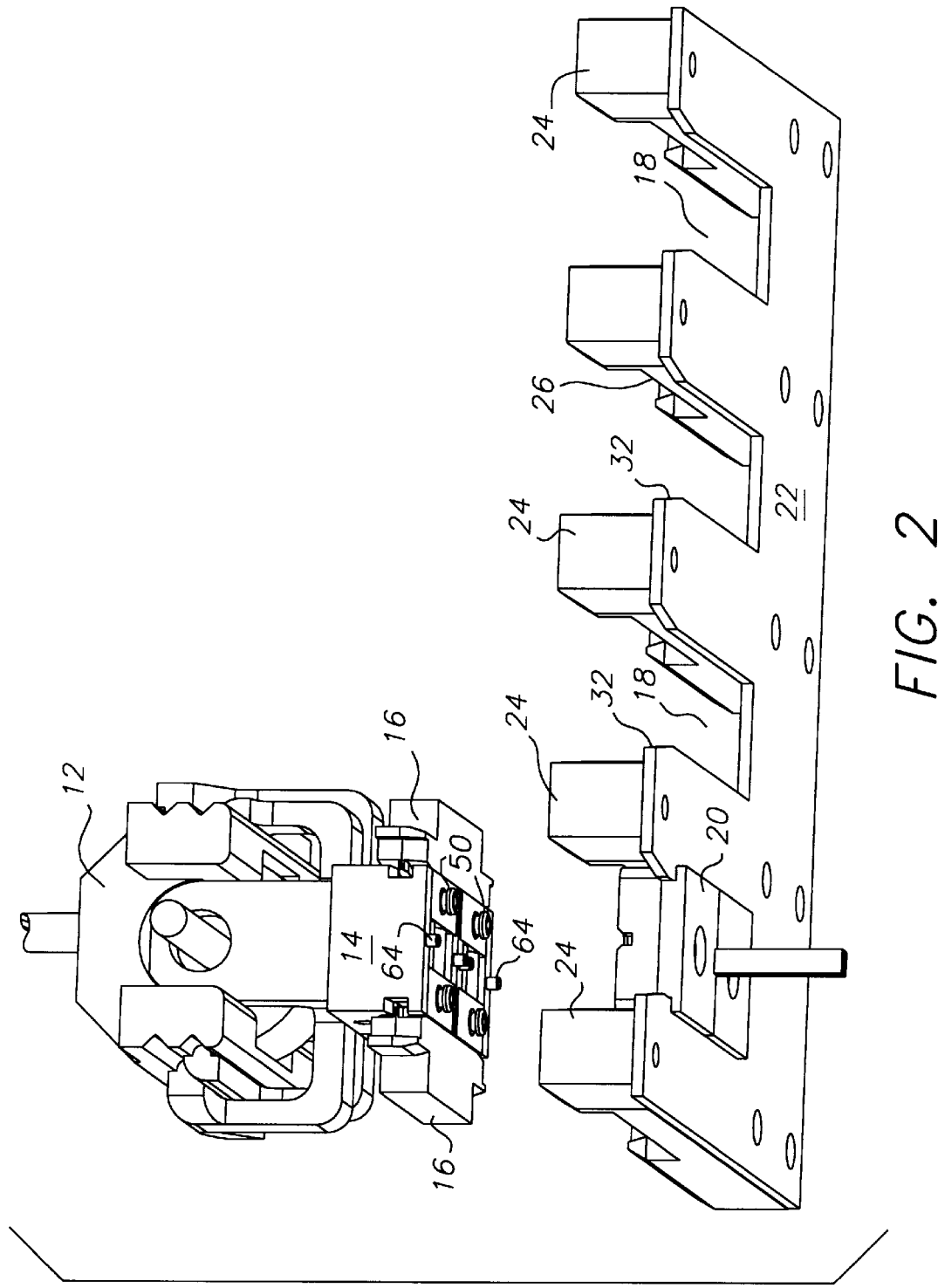
FIG. 2 is another perspective view of the tool rack and tool attachment block of the present invention with the tool attachment block affixed to the tool interface portion of the robotic arm.
Figure 3:
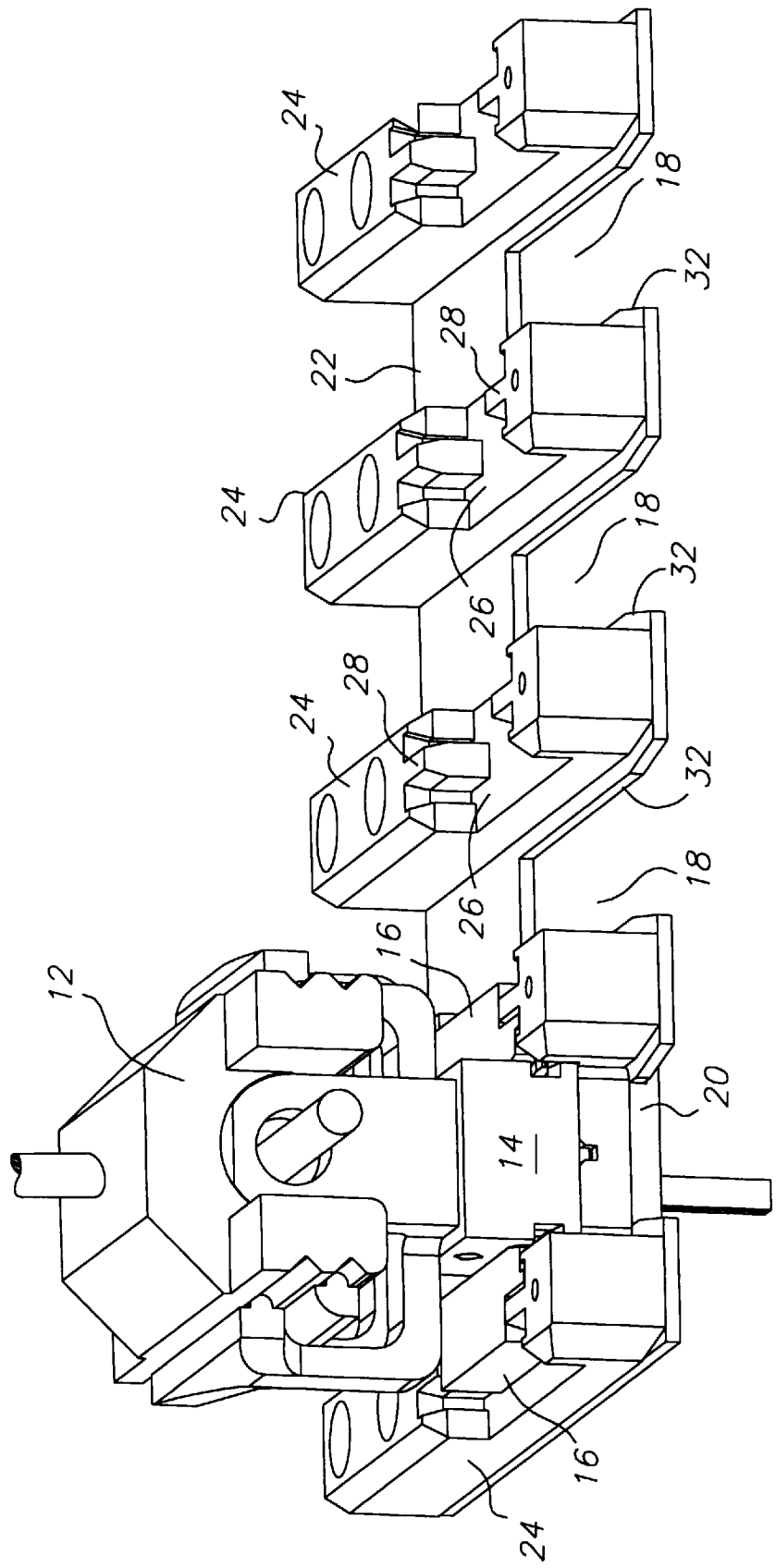
FIG. 3 is a perspective view of the tool rack wherein the robotic arm has lowered the tool attachment block to interface with the tool adapter plate of the tool residing in the tool rack.

Turning first to FIGS. 1, 2, and 3, there are shown perspective views of a portion of a tool rack 10 with a tool interface portion 12 of a robotic arm (not shown) suspended thereabove. Attached to tool interface portion 12 is a tool attachment block 14. Positioned on opposite sides of tool attachment block 14 are magnetic shunt bars 16. Tool rack 10 consists of a series of tool slots 18 each of which is capable of providing residence for a particular tool. As depicted in FIG. 1, only one of the tool slots 18 has a tool 20 residing therein. Tool rack 10 includes a base plate 22 supported by means not shown. Affixed to base plate 22 are a series of blocks 24 with each of such blocks 24 having a pair of receptacles 26 therein each receptacle 26 is configured to provide residence for a shunt bar 16. Each pair of receptacles 26 in an individual block 24 may be contiguous with one another as depicted in FIGS. 1 and 2 or they may be separate. In other words, as depicted in FIGS. 1 and 2, block 24 includes a pair of projections 28 which extend into receptacles 26. Rather than having a pair of projections 28, the projections could be extended to meet one another to form a single wall thereby separating the two receptacles 26. This of course would also require a reconfiguration of shunt bar 16 so that they could slide into the individual receptacles 26. This type of configuration is schematically depicted in FIGS. 9 through 21.

Base plate 22 includes a plurality of fingers 30 extending outward therefrom in a cantilevered configuration. Blocks 24 extend from the base plate section out onto the fingers 30. The width of each block 24 is less than the width of each finger 30 thereby providing a projecting edge or tongue 32 on each side of a block 24. Tool slots 18 between adjacent fingers 30 provide a nesting position in which stored tools 20 are supported.

Figure 4:
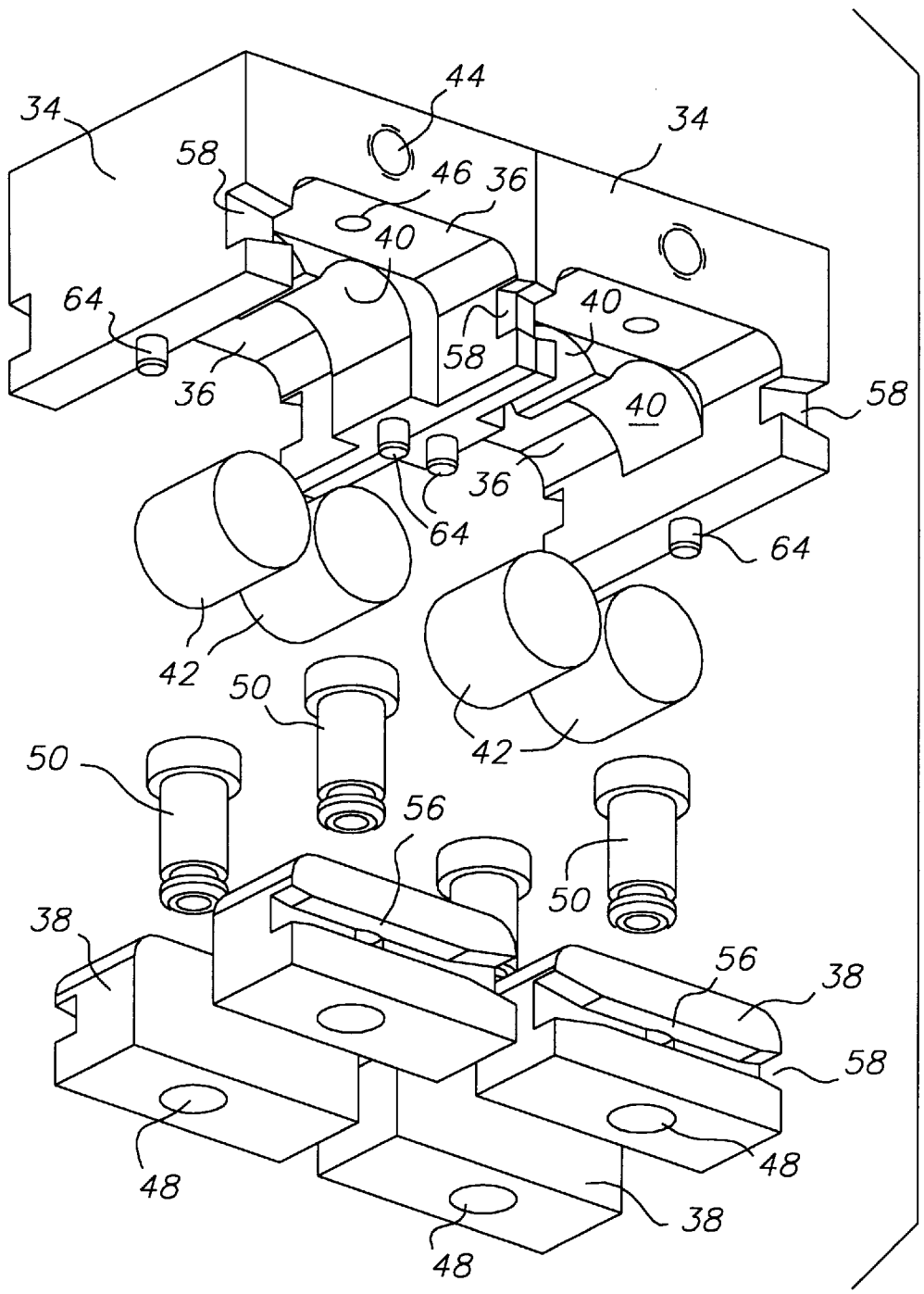
FIG. 4 is an exploded perspective view of a preferred embodiment bifurcated tool attachment block of the present invention.
Figure 5:
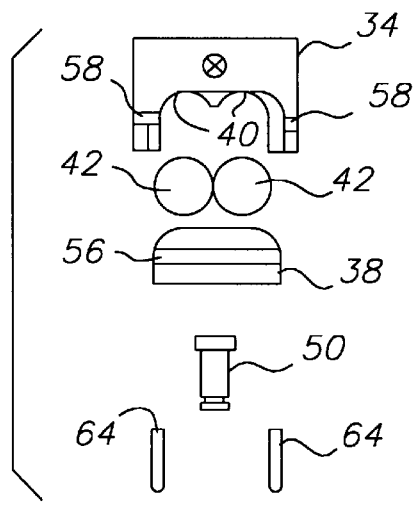
FIG. 5 is an exploded front elevational view of one portion of the bifurcated tool attachment block depicted in FIG. 4.

Looking next at FIGS. 4 and 5, tool attachment block 14 is shown in greater detail. Tool attachment block 14 must be configured to interface with and operate a variety of different tools. Such different tools may include a finger gripping tool 20 as depicted in FIGS. 1 and 2 as will be described in more fully hereinafter. Different types of tools for acquiring and holding work pieces or for performing other work functions may also be supported within tool rack 10. Exemplary tools include vacuum cups, drivers, soldering guns, ultrasonic horns, spring insertion tools, etc. As depicted, tool block 14 actually is comprised of two separate housing members 34. Each housing member 34 includes a pair of side wall receptacles 36 which provide residence for side walls 38. Each housing 34 also includes a pair of saddles 40 residing between side walls receptacles 36. A permanent magnet 42 resides in each saddle 40. There is a bore 44 through each housing 34 which serves as pneumatic manifold for operation of tools 20. Bores 44 are connected to a pneumatic supply by means of tubing (not shown). There is a bore 46 in each side wall receptacle 36 which intersect with an associated bore 44. Similarly there is a bore 48 through each of side walls 38 which aligns with an associated bore 46. Residing in each bore 48 is a pneumatic coupler 50. Pneumatic couplers 50 insert into ports 52 (see FIG. 6) of tool adapter plate 54 when a tool attachment block 14 is engaged with tool adapter plate 54. Each port 52 is connected to internal manifold (not shown) for supplying the necessary pneumatic pressure or vacuum for operation of tool 20.

Figure 7:
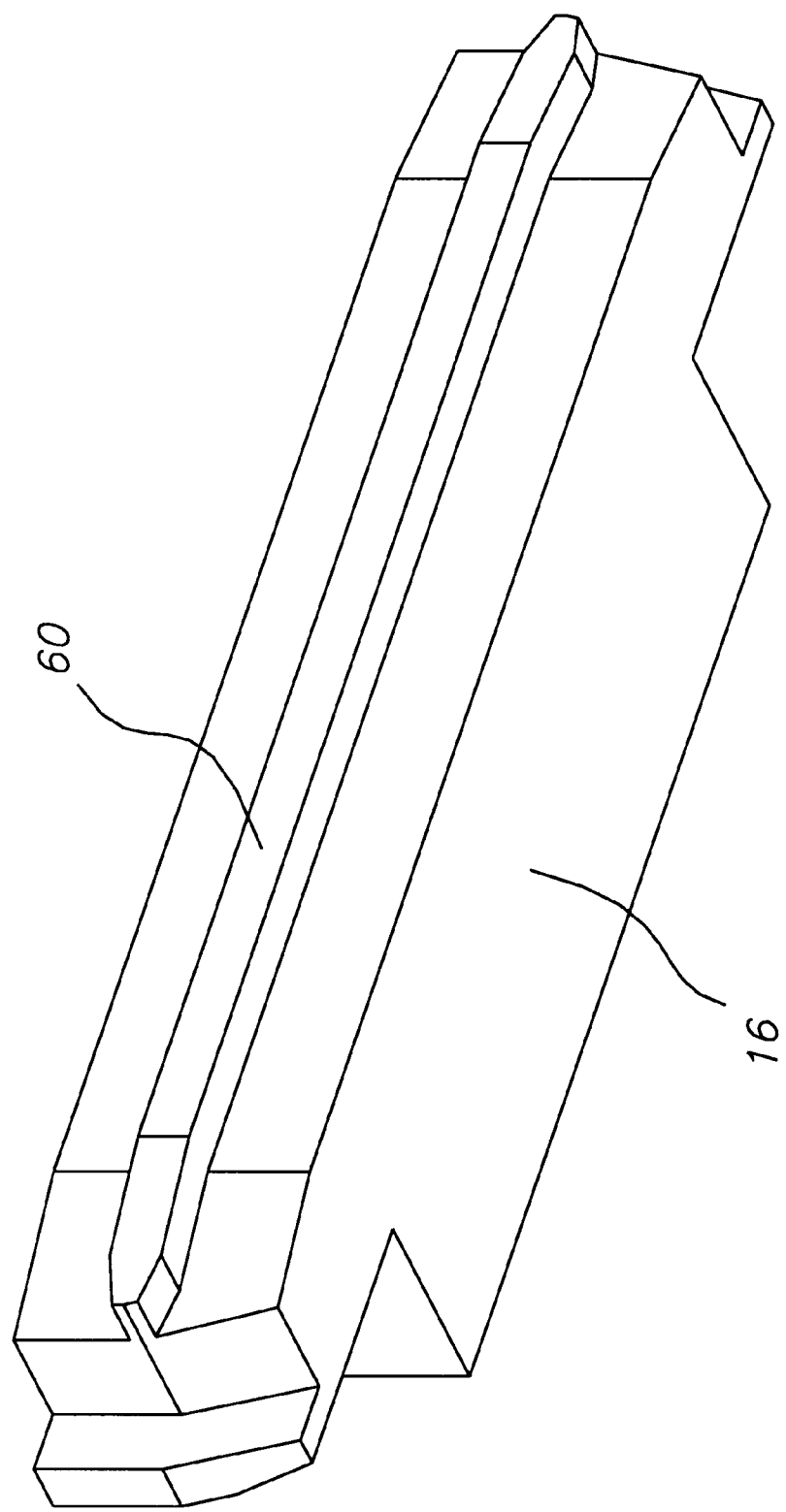
FIG. 7 is a perspective view of a shunt bar.

Each side wall 38 has a slot 56 therein which aligns with flared openings 58 in each housing 34. To form a single slot on opposing faces of tool attachment block 14. Slots 56 with flared openings 58 serve as a guide for lip 60 projecting from each magnetic shunt bar 16 (see FIG. 7), the operation of which will be described more fully hereinafter.

Figure 6:
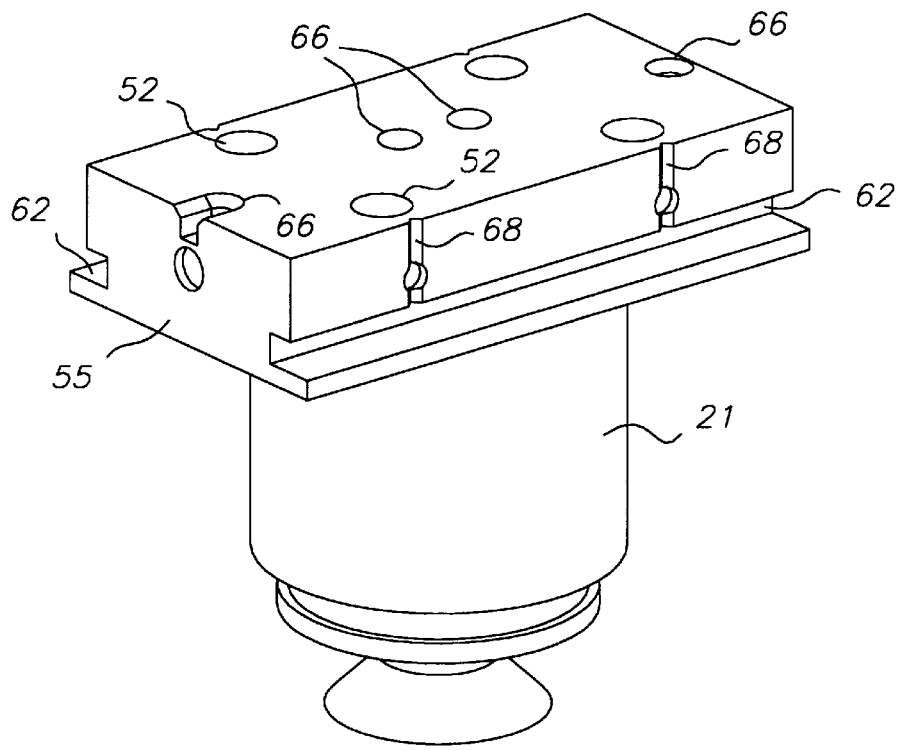
FIG. 6 is a perspective view of a vacuum cup tool and associated tool adapter plate for use with the present invention.
Figure 8:
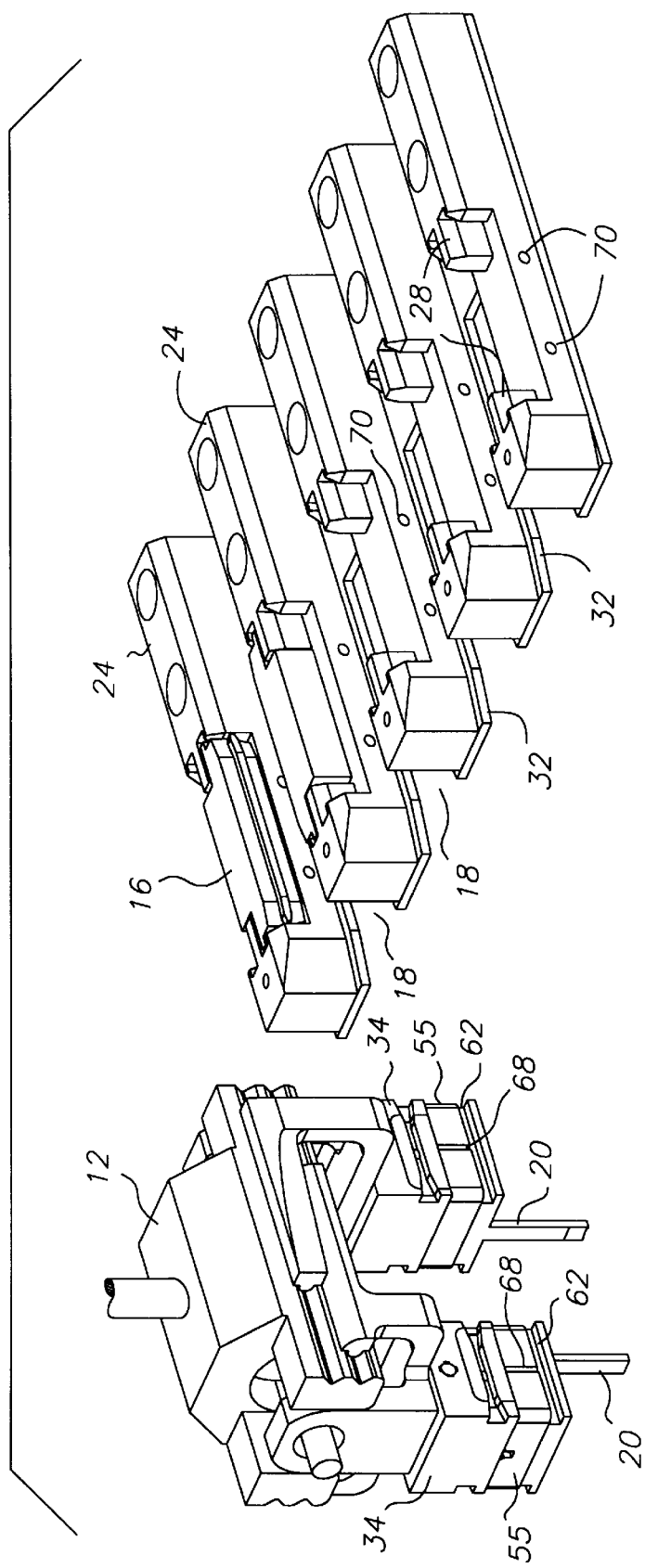
FIG. 8 is a perspective view of the tool rack and a bifurcated tool attachment block having a gripping tool with its associated tool adapter plate in the spread position.

Tool adapter plates 54 will, depending on the particular tool to which it is affixed, will typically be either a one or two-part element. For example, an alternative tool adapter plate 55 can be made as a single element as depicted in FIG. 6 when the tool 21 to which it is affixed, such as a single vacuum cup does not require bifurcated movement. However, it should be understood that the tool interface portion 12 is adapted to drive the two separate housings 34 of tool attachment block 14 toward and away from one another. Thus, for tools 20 such as the gripper fingers depicted in FIGS. 1, 3, and 8, the two-part tool adapter plate 54 is necessary to allow the gripper fingers to be moved toward and away from each other for acquiring and releasing work objects. Tool adapter plates 54, 55 include grooves 62 positioned on opposing faces thereof. Tongues 32 reside in grooves 62 when a tool 20 with its associated tool adapter plate 54, 55 is supported in tool rack 10. Projecting from the bottom face of each housing 34 are a pair of alignment pins 64. Alignment pins 64 insert into alignment openings 66 of tool adapter plates of 54, 55 when tool attachment block 14 is engaged with tool adapter plate 54. This ensures proper alignment of pneumatic couplers 50 with ports 52. Each tool adapter plate 54, 55 may be equipped with grooves 68 designed to interact with ball plungers 70 projecting from the sides of blocks 24 below recesses 26. Ball plungers 70 can be used to hold the adapter plate 54, 55 with its associated tool in alignment during tool changing operations.

It is important to try to maintain a planar interface between the respective mating surfaces of adapter plates 54, 55 and the tool attachment block 14. The same is true for the respective mating surfaces of the magnetic shunt bars 16 and the sides walls 38 with slots 56 and flared opening 58 therein. A planar interface is needed to ensure control of the magnetic gap therebetween. Control of the magnetic gap between respective mating surfaces of the magnetic shunt bars 16 and the sides walls 38 with slots 56 and flared opening 58 therein can be accomplished by coating such surfaces with a non-magnetic material. For example, such surfaces may be a coated with a layer of Teflon® approximately 1 mil in thickness. Control of the magnetic gap between respective mating surfaces of the adapter plates 54, 55 and the tool attachment block 14 can also be accomplished by coating the adapter plates 54, 55 with a non-magnetic material. Preferably, the adapter plates 54, 55 are coated with a layer of nickel having a thickness in the range of from about 3 mils to about 4 mils.

The tool interface portion 12 which is affixed to the robot arm (not shown) is preferably the tool interface disclosed in U.S. patent application Ser. No. 08/865,794 entitled, Apparatus and Method Having Short Stroke Arcuate Motion for Grasping Objects, and U.S. patent application Ser. No. 08/865,796 entitled, Apparatus and Method Having Short Stroke Linear Motion for Grasping Objects both filed on May 30, 1997, which are hereby incorporated herein by reference. Such tool interfaces may be used in conjunction with a robot such as the Robot World® as manufactured by Yaskawa Electric of America located in Cypress, California.

Figure 9:
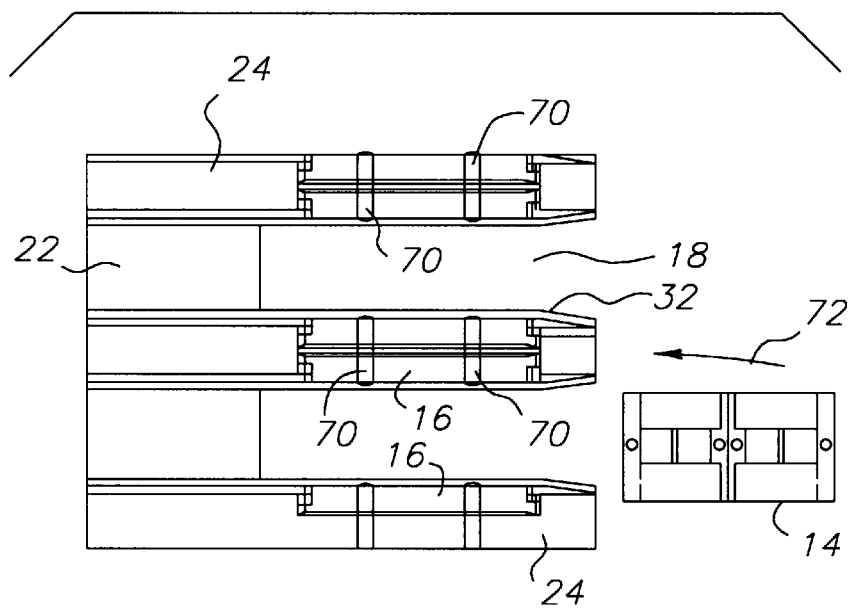
FIG. 9 is a top plan view of two tool slots of the tool rack showing the approach of the tool for insertion into a tool slot.
Figure 10:
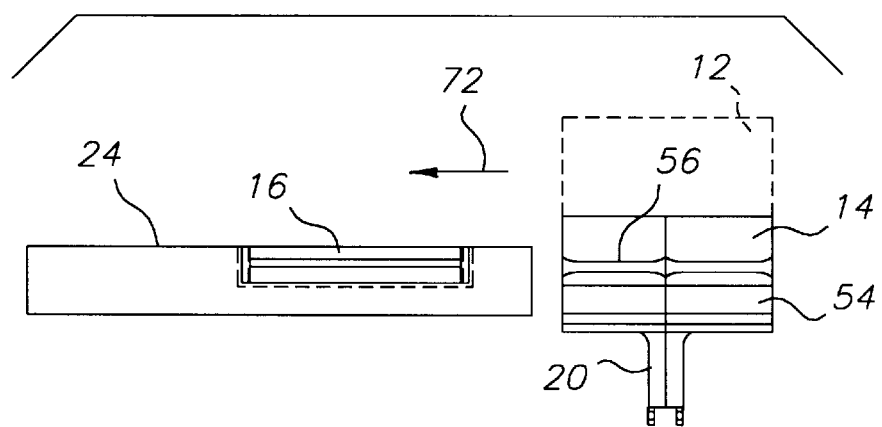
FIG. 10 is a side elevational view of the tool slots depicted in FIG. 9 showing the approach of the tool for insertion into a tool slot.
Figure 11:
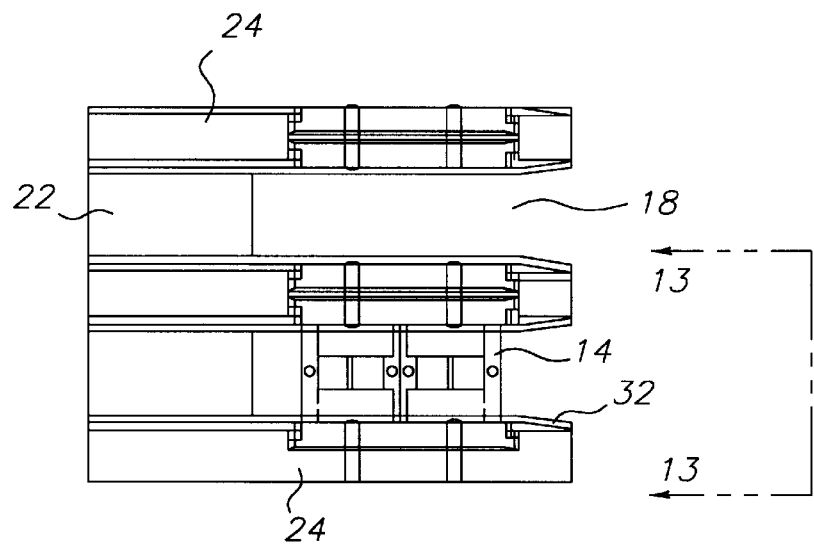
FIG. 11 is a top plan view of two tool slots of a tool rack with the robotic arm having placed the tool in the nesting position within one of the tool slots.
Figure 12:
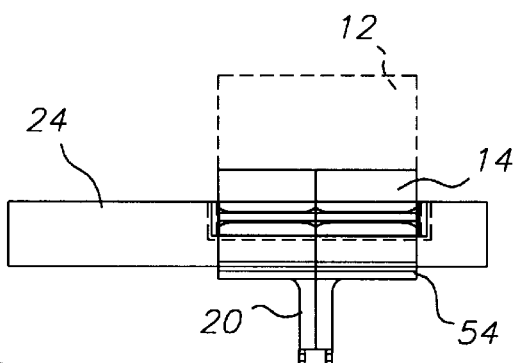
FIG. 12 is a side elevational view of the tool slots depicted in FIG. 11 with the robotic arm having placed the tool in the nesting position within one of the tool slots.
Figure 13:
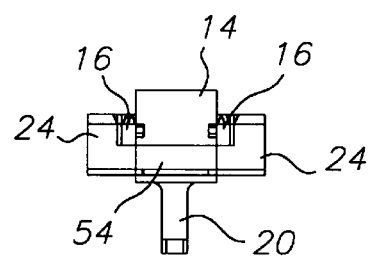
FIG. 13 is a front elevational view of one tool slot depicted in FIG. 11 as viewed from line 13—13.
Figure 14:
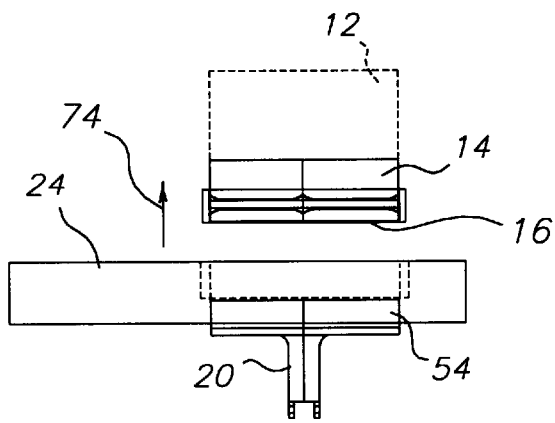
FIG. 14 is a side elevational view of the robotic arm lifting the tool adapter plate and magnetic shunt bars from the tool rack while leaving the tool in the nesting position in the tool slot.
Figure 15:
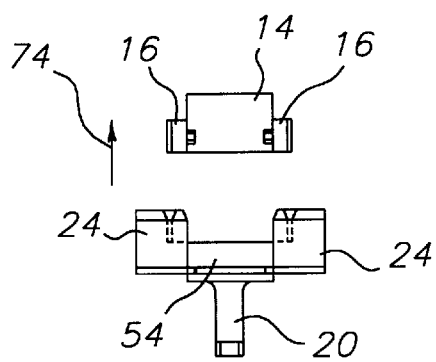
FIG. 15 is a front elevational view of the robotic arm lifting the tool adapter plate and magnetic shunt bars from the tool rack while leaving the tool in the nesting position in the tool slot.
Figure 16:
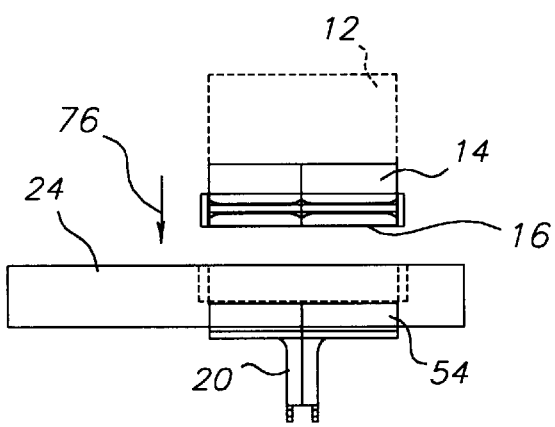
FIG. 16 is a side elevational view of the tool attachment block with magnet shunt bars attached thereto being lowered into another tool slot in the tool rack to acquire another tool.
Figure 17:
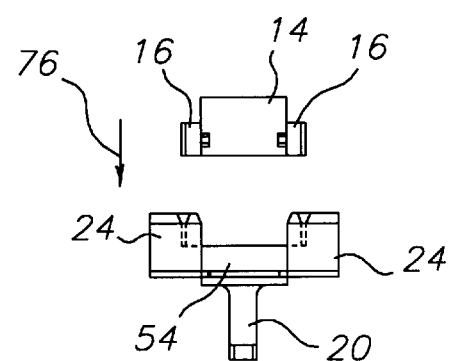
FIG. 17 is a front elevational view of the tool attachment block with magnet shunt bars attached thereto being lowered into another tool slot in the tool rack to acquire another tool.
Figure 18:
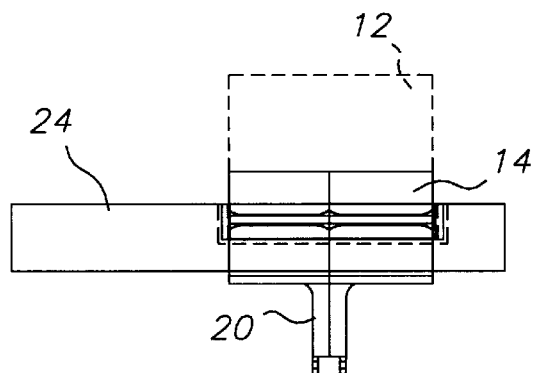
FIG. 18 is side elevational view showing the tool attachment block lowered to engage the tool adapter plate of the tool to be acquired.
Figure 19:
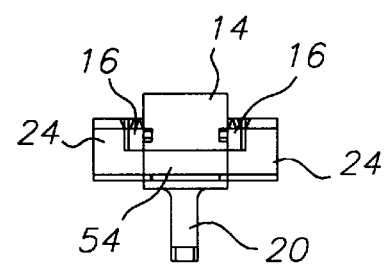
FIG. 19 is a front elevational view showing the tool attachment block lowered to engage the tool adapter plate of the tool to be acquired.
Figure 20:
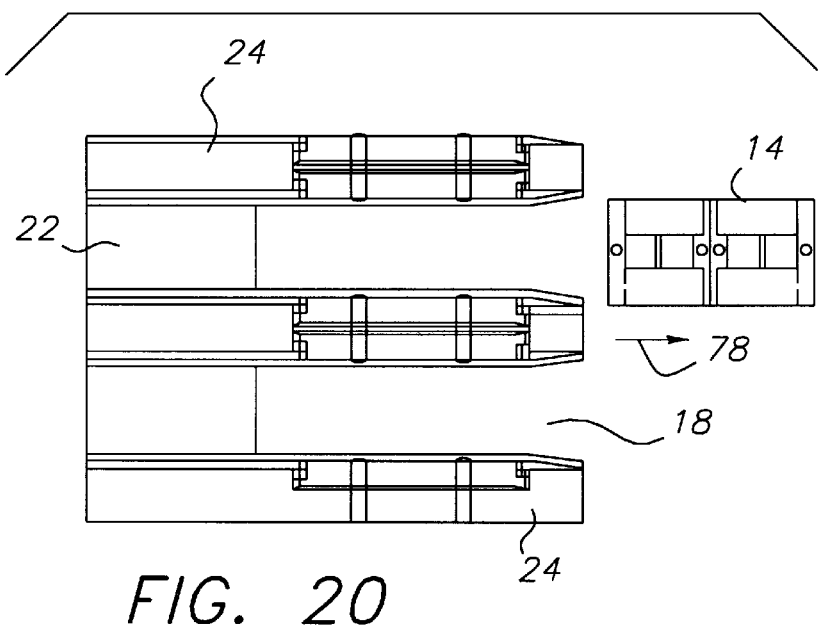
FIG. 20 is a top plan view showing horizontal movement of the tool attachment block with the acquired tool affixed thereto to thereby remove that tool from the tool rack while leaving the magnetic shunt bars in the tool rack.
Figure 21:
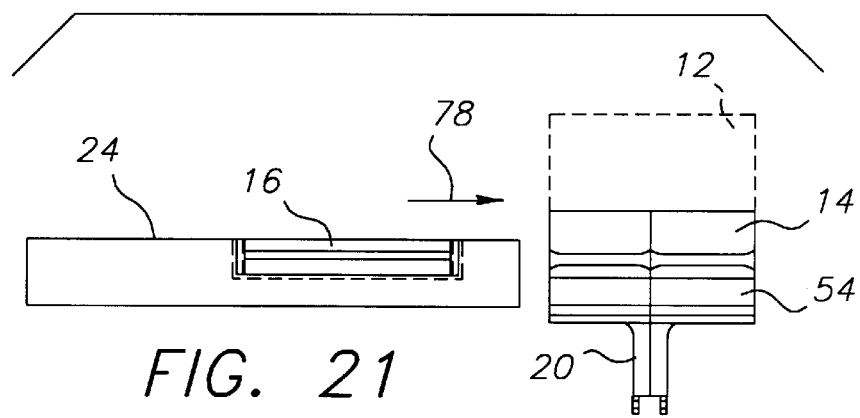
FIG. 21 is a side elevational view showing horizontal movement of the tool attachment block with the acquired tool affixed thereto to thereby remove that tool from the tool rack while leaving the magnetic shunt bars in the tool rack.

Turning next to FIGS. 9 to 21, there is schematically depicted a tool change sequence. For purposes of clarity and simplicity, such schematic drawings show only two tool slots 18 and show only a single gripper finger tool with a coupling tool adapter plate 54 and tool attachment block 14. The tool interface portion 12 and the robotic arm are not shown. As depicted in FIGS. 9 and 10 the robotic arm (not shown) with the tool attachment block 14 having a tool adapter plate 54 and tool 20 connected thereto delivers the tool adapter plate 54 and associated tool 20 to a tool slot 18 by approaching tool slot 18 from a horizontal plane moving in the direction indicated by arrow 72. The robotic arm controls the height at which tool adapter plate 54 is held such that groove 62 aligns with tongue 32. In such manner, tongues 32 of a particular tool slot 18 insert into grooves 62 on each side of tool adapter plate 54 thereby capturing tool adapter plate and its associated tool 20, 21 in tool slot 18. Ball plungers 70 insert into grooves 68 to aid in retaining tool adapter plate 54 in the proper position within tool slot 18. In this proper position, the lips 60 of the magnetic shunt bars 16 residing on each side of that tool slot 18 reside in slots 18 of tool attachment block 14. Magnetic shunt bars 16 actually contact the sides of tool attachment block 14. The magnetic shunt bars 16 serve to shunt the magnetic force which attaches tool adapter plate 54 to tool attachment block 14 such that the majority of the magnetic force from magnets 42 is now directed through shunt bars 16. In other words, an alternative path for the magnetic flux is provided which greatly reduces but does not eliminate the attractive force between the tool attachment block 14 and the tool adapter plate 54. The proper positioning of tool attachment block 14 and tool adapter plate 54 in a tool slot 18 is depicted in FIGS. 11 to 13. In order to leave a tool adapter plate 54 and its associated tool 20 in a tool slot 18, the robotic arm lifts vertically as denoted by arrow 74 (see FIGS. 14 and 15). With the shunt bars 16 magnetically attached to tool attachment block 14, relatively little force is needed to separate tool attachment block 14 from tool adapter plate 54. In such manner, the particular tool 20 is left in its associated tool slot 18 with tongues 32 residing in slots 62. The robotic arm is now free to move the tool attachment block 14 with shunt bars 16 magnetically attached thereto to a different tool slot 18 to acquire a different tool. As depicted in FIGS. 16 and 17, in order to acquire a tool from the tool rack 10 the robotic arm (not shown) moves directly over the tool slot 18 in which the desired tool is supported. The robotic arm lowers the tool attachment block 14 such that alignment pins 64 insert into alignment openings 66. In addition, shunt bars 16 insert into recesses 26 in each block 24 adjacent that particular tool slot 18. Movement of the tool attachment block 14 vertically downward is designated by arrow 76. With the tool attachment block 14 mated with the tool adapter plate 54 the new tool, as depicted in FIG. 18 and 19, the new tool can be extracted from its associated tool slot 18. In order to remove a tool from its associated tool slot 18, the robotic arm moves horizontally out of tool slot 18 as shown by arrow 78 (see FIGS. 20 and 21). By moving horizontally, shunt bars 16 are retained in their associated recesses 26 which tool attachment block 14 and tool adapter plate 54 move out of tool slot 18 such that tongues 32 no longer reside in slots 62. Once free of the tool slot 18, the robotic arm is free to move the arm the acquired tool to perform any required work therewith. With the shunt bars 16 removed, full magnetic attachment between tool attachment block 14 and tool adapter plate 54 is accomplished. This magnetic attachment force is all that is needed to perform work with the acquired tool.

From the foregoing, it should be clear that using the magnetic attachment system of the present invention, a robotic arms can automatically acquire from or deliver to a tool rack 10 a variety of different tools without any manual intervention. In other words, the robot can be programmed to automatically exchange tools as supported in the tool rack 10 and use the desired tools in a predetermined sequence to perform specific work functions. An operator is not required to aid in the removal of a particular tool from tool attachment block 14 or the attachment of a particular tool to attachment block 14. Attachment is accomplished through magnetic force alone and through the use of shunt bars 16, magnetic flux is rerouted to make detachment of tool attachment plates 54 from tool attachment blocks 14 easy for the robot to accomplish. The magnetic flux substantially reroutes the magnetic attachment force between tool attachment block 14 and tool adapter plate 54 is greatly reduced such that the robot can easily overcome the remaining attachment force.

From the foregoing, it will be seen that this invention as one well adapted to attain all of the ends and objects hereinabove set forth together with the other advantages which are apparent and which are inherent to the invention.

It will be understood that certain features and some accommodations are of utility and may be employed with reference to other features and some combinations. This is contemplated by and is within the scope of the claims.

As many possible embodiments may be made of the invention without departing from the scope thereof, it is to be understood that all matter herein said forth and shown in the accompanying drawings is to be interpreted as illustrative and not an eliminating sense.

What is claimed is:

1. A tool attachment and release system for robotic arms comprising:

(a) a tool rack having at least two tool slots therein, each of said at least two tool slots being capable of supporting a selectable tool, each of said tool slots including an open end and two sides, each of said selectable tools including a tool adapter plate;

(b) a tool attachment block adapted to be attached to a robotic arm, said tool attachment block including a permanent magnet, said permanent magnet affixing said tool attachment block to a selected one of said tool adapter plates when the robotic arm is manipulated to cause said tool attachment block to abut said selected one of said tool adapter plates;

(c) a magnetic shunt bar receptacle located on each of said two sides of each of said tool slots; and (d) a magnetic shunt bar residing in each of said magnetic shunt bar receptacles, said magnetic shunt bars remaining attached to said tool attachment block when said tool attachment block is moved in a first direction away from said tool slot to thereby leave said selectable tool supported in said tool slot, said magnetic shunt bars remaining in said shunt bar receptacles when said tool attachment block is moved in a second direction away from said tool slot to thereby remove said selectable tool from said tool slot.

2. A tool attachment and release system for robotic arms comprising:

(a) a tool rack having at least one tool slot therein, said tool slot being capable of supporting a tool, said tool slot including an open end, a closed end and two sides, said tool including a tool adapter plate;

(b) a tool attachment block adapted to be attached to a robotic arm, said tool attachment block including a permanent magnet, said permanent magnet affixing said tool attachment block to said tool adapter plate when the robotic arm is manipulated to cause said tool attachment block to abut said tool adapter plate;

(c) a magnetic shunt bar receptacle located on each of said two sides of said tool slot; and (d) a magnetic shunt bar residing in each of said magnetic shunt bar receptacles, said magnetic shunt bars remaining attached to said tool attachment block when said tool attachment block is moved in a first direction away from said tool slot to thereby leave a tool supported in said tool slot, said magnetic shunt bars remaining in said shunt bar receptacles when said tool attachment block is moved in a second direction away from said tool slot to thereby remove said tool from said tool slot.

3. A tool attachment and detachment apparatus comprising:

(a) a tool rack having at least one tool slot therein, said tool slot being capable of supporting a tool, said tool slot including an open end and two sides, said tool including a tool adapter plate;

(b) a tool attachment block adapted to be attached to a robotic arm, said tool attachment block including a permanent magnet, said permanent magnet affixing said tool adapter plate to said tool attachment block when said tool attachment block is caused to abut said tool adapter plate;

(c) a magnetic shunt bar receptacle located on each of said two sides of said tool slot; and (d) a magnetic shunt bar residing in each of said magnetic shunt bar receptacles, said magnetic shunt bars redirecting a portion of the magnetic flux of said permanent magnet when in contact with said tool attachment block thereby lessen the magnetic attachment force between said tool attachment block and said tool adapter plate when said tool attachment block is moved in a first direction away from said tool slot to thereby leave a tool supported in said tool slot, said magnetic shunt bars remaining in said shunt bar receptacles when said tool attachment block is moved in a second direction away from said tool slot to thereby remove said tool from said tool slot.

4. A tool attachment and release system for robotic arms comprising:

(a) at least one selectable tool supported in a tool rack, each of said selectable tools including a tool adapter plate;

(b) a tool attachment block adapted to be affixed to a robotic arm, said tool attachment block including at least one permanent magnet, said at least one permanent magnet generating a pattern of magnetic flux, said pattern of magnetic flux being directed through a selected one of said tool adapter plates when said tool attachment block is caused to abut said selected one of said tool adapter plates, said pattern of magnetic flux affixing said tool attachment block to said selected one of said tool adapter plates; and (c) means for redirecting a portion of said pattern of magnetic flux away from said selected one of said tool adapter plates.

5. A tool attachment and release system as recited in claim 4, said tool rack comprising:

at least two tool slots, each of said at least two tool slots being capable of supporting a selectable tool, each of said at least two tool slots including an open end and two sides.

6. A tool attachment and release system as recited in claim 5 wherein:

each of said selectable tools includes a tool adapter plate.

7. A tool attachment and release system as recited in claim 6 wherein said means for redirecting comprises:

a shunt bar receptacle in each of said sides of said at least two tool slots, each of said shunt bar receptacles capable of retaining a shunt bar therein, said shunt bars being magnetically attached to said tool attachment block when said tool attachment block is mated to a selected one of tool adapter plates, said shunt bars remaining attached to said tool attachment block when said tool attachment block is moved in a first direction, said shunt bars remaining in said shunt bar receptacles when said tool attachment block when said tool attachment block is moved in a second direction.

8. A tool attachment and release system as recited in claim 1 wherein:

said at least one permanent magnet generates a pattern of magnetic flux, said pattern of magnetic flux being directed through a selected one of said tool adapter plates when said tool attachment block is caused to abut said selected one of said tool adapter plates, said pattern of magnetic flux affixing said tool attachment block to said selected one of said tool adapter plates; and said magnetic shunt bars redirect a portion of said pattern of the magnetic flux when said magnetic shunt bars are in contact with said tool attachment block thereby lessening a magnetic force of attachment between said tool attachment block and said tool adapter plate.

* * * * *